United States Patent [19]

Pafford

[11] Patent Number: 4,955,687
[45] Date of Patent: Sep. 11, 1990

[54] FIBER OPTIC TELESCOPE

[76] Inventor: Thomas L. Pafford, 419 Sun Rise Ave., Cocoa Beach, Fla. 32931

[21] Appl. No.: 320,528

[22] Filed: Mar. 8, 1989

Related U.S. Application Data

[63] Continuation-in-part of Ser. No. 889,223, Jul. 25, 1986, Pat. No. 4,828,348.

[51] Int. Cl.⁵ .............................................. G02B 6/06
[52] U.S. Cl. ............................. 350/96.25; 350/96.10; 350/96.24; 350/537
[58] Field of Search ............... 350/96.10, 96.15, 96.18, 350/96.20, 96.24, 96.25, 96.27, 537

[56]  References Cited

U.S. PATENT DOCUMENTS

| | | | |
|---|---|---|---|
| 3,666,346 | 5/1972 | Lucas | 350/96.25 |
| 4,201,197 | 5/1980 | Dismer | 350/96.10 X |
| 4,297,000 | 10/1981 | Fries | 350/96.24 |
| 4,307,936 | 12/1981 | Ochiai | 350/96.24 |
| 4,389,085 | 6/1983 | Mori | 350/96.10 |
| 4,411,490 | 10/1983 | Daniel | 350/96.10 |
| 4,483,311 | 11/1984 | Whitaker | 126/440 |
| 4,487,646 | 12/1984 | Murray et al. | 156/177 |
| 4,511,755 | 4/1985 | Mori | 350/96.10 X |
| 4,650,279 | 3/1987 | Magee | 350/96.24 |
| 4,723,826 | 2/1988 | Whitaker | 350/96.10 |
| 4,828,348 | 5/1989 | Pafford | 350/96.10 |

FOREIGN PATENT DOCUMENTS

| | | |
|---|---|---|
| 1942971 | 2/1970 | Fed. Rep. of Germany . |
| 8406058 | 4/1984 | France . |
| 60-41006 | 3/1985 | Japan . |
| 2084347 | 4/1982 | United Kingdom . |

*Primary Examiner*—John D. Lee
*Attorney, Agent, or Firm*—Kerkam, Stowell, Kondracki & Clarke

[57]  ABSTRACT

A fiber optic telescope for use as an electromagnetic energy collector, wherein two or more collector cells are connected via the fiber optic waveguide and a converging connecting means. A plurality of the cells may be connected in series or in a cascading relationship. Applications of the system include a telescope, a solar energy collector or any other uses where collection of electromagnetic radiation is required.

14 Claims, 4 Drawing Sheets

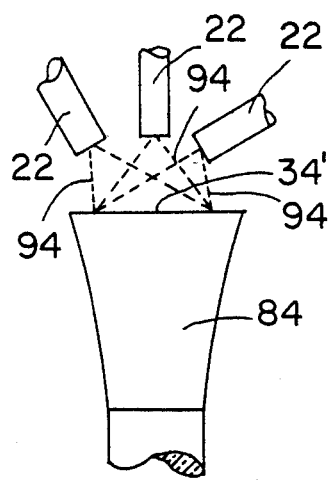
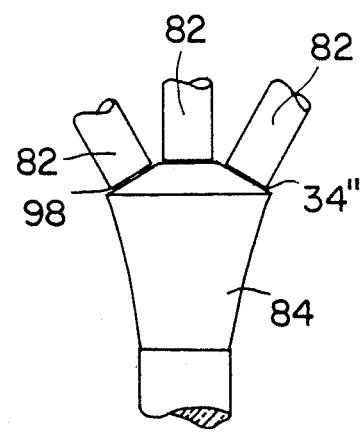
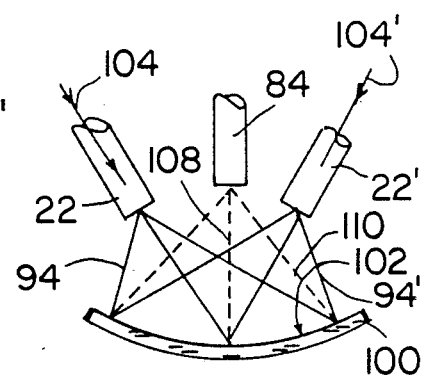
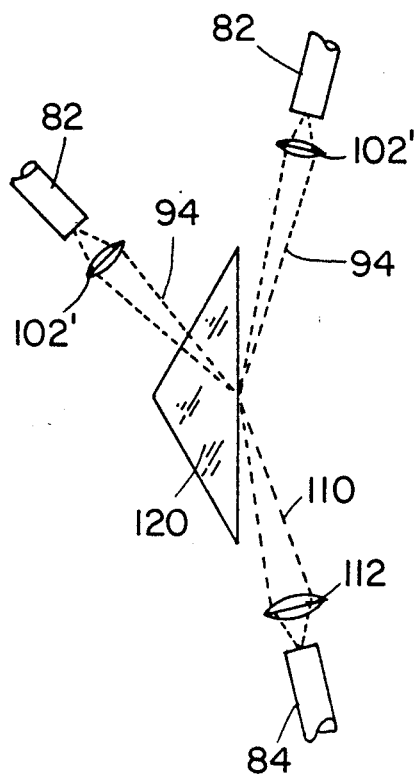
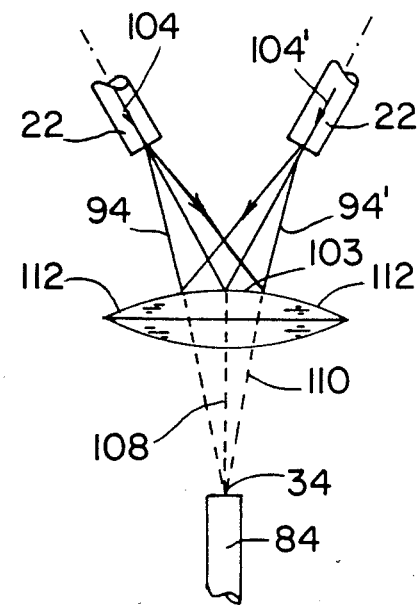

FIBER OPTIC TELESCOPE

This application is a Continuation-In-Part Application of U.S. Pat. application No. 889,223 (Pat. No. 4,828,348) and is related to U.S. Pat. application No. 868,539 (Pat. No. 4,824,204) all having a common inventor.

BACKGROUND OF THE INVENTION

TECHNICAL FIELD

The present invention relates generally to the collection of radiant, i.e. electromagnetic energy by collectors, and more particularly, to the collection and delivery of electromagnetic energy to a locus of useful application, i.e. a fiber optic telescope by utilization of a fiber waveguide.

BACKGROUND OF THE INVENTION

The field of optics in general, and of the use of light and other radiation has been revolutionized by the advent of fiber optical waveguides. Astronomy has also benefited by using fiber optics in the collection and focussing of light from distant objects. For example, U.S. Pat. No. 4,650,279, issued to Magee, proposes to utilize an optical telescope having a plurality of receivers spaced at a distance from each other in order to increase the resolution of the telescope, as is done presently in the field of radio astronomy.

A number of drawbacks exist that render that proposed system impractical, overly complicated and too expensive for general use. Specifically, the proposed system utilizes fiber bundles having many separate optical fiber strands which are then arranged in a fiber optic array. Separate arrays are then merged and interconnected with a single output aperture to produce a single combined image. To properly combine the image from each of the separate arrays, however, one must make each of the optical strands of identical length, or lengths being within 1/20th of a wavelength. The telescoping system and lens described by McGee are said to require such exact calibration in order to develop a coherent image at the output end. An elaborate system of piezoelectric or magnetostrictive driven hammers are proposed to adjust the length of each individual optical fiber in order to achieve a coherent image.

Further, in the field of solar energy collection, the locus at which the radiant impinges is frequently not the point at which it is needed. For example, in solar hot water heating, the solar energy normally impinges on the roof of a structure such as a house. The hot water, however, is utilized within the house, necessitating the pumping of cool water to the roof, heating the water and pumping it back to a place it is used. This results in loss of thermal energy during the pumping process, unnecessary expense due to plumbing and roof support requirements, and the occasional water leak from the plumbing.

What is necessary in both the telescope and solar energy collector examples is a device that can collect electromagnetic energy, focus and concentrate it and deliver it to the point in a system where it will be ultimately utilized.

SUMMARY OF THE INVENTION

It is therefore a principal object of the present invention to provide for collection of radiant, i.e. electromagnetic energy at a remote site from its point of utilization, and also to provide a merging means for delivering the radiant energy to the point of utilization.

It is another principal object of the present invention to provide a fiber optic electromagnetic energy collector which can be utilized as a telescope.

Another principal object of the present invention is to provide a fiber optic electromagnetic energy collector system which can be utilized as a solar energy collector.

It is yet another object and a significant feature of the present invention to provide for a connector which is capable of merging two or more radiant i.e., electromagentic energy beams into a single coherent beam so as to form an image.

One advantage provided by the present invention is the inexpensive, effective radiant, i.e., electromagnetic energy collection and delivery system for use in a desired application.

Another advantage of the present invention is the capability to provide collected radiant energy to the point of ultimate utilization through a passive system.

In accordance with these objects, features and advantages, there is provided a fiber optic telescope for delivering electromagnetic energy to a locus of useful application including, at least two collector cells, a focussing means, a fiber waveguide means for receiving the electromagnetic radiation focussed by the focussing means and a converging means for receiving the electromagnetic radiation from the fiber waveguide means and directing it to a locus of useful application.

BRIEF DESCRIPTION OF THE DRAWINGS

Other objects, features and advantages will occur from the following description of the preferred embodiment and the accompanying drawings in which:

FIGS. 4A–4E represent different embodiments of the converging means, i.e., connectors according to the present invention.

DETAILED DESCRIPTION OF THE PREFERRED EMBODIMENTS

Figure 1A:
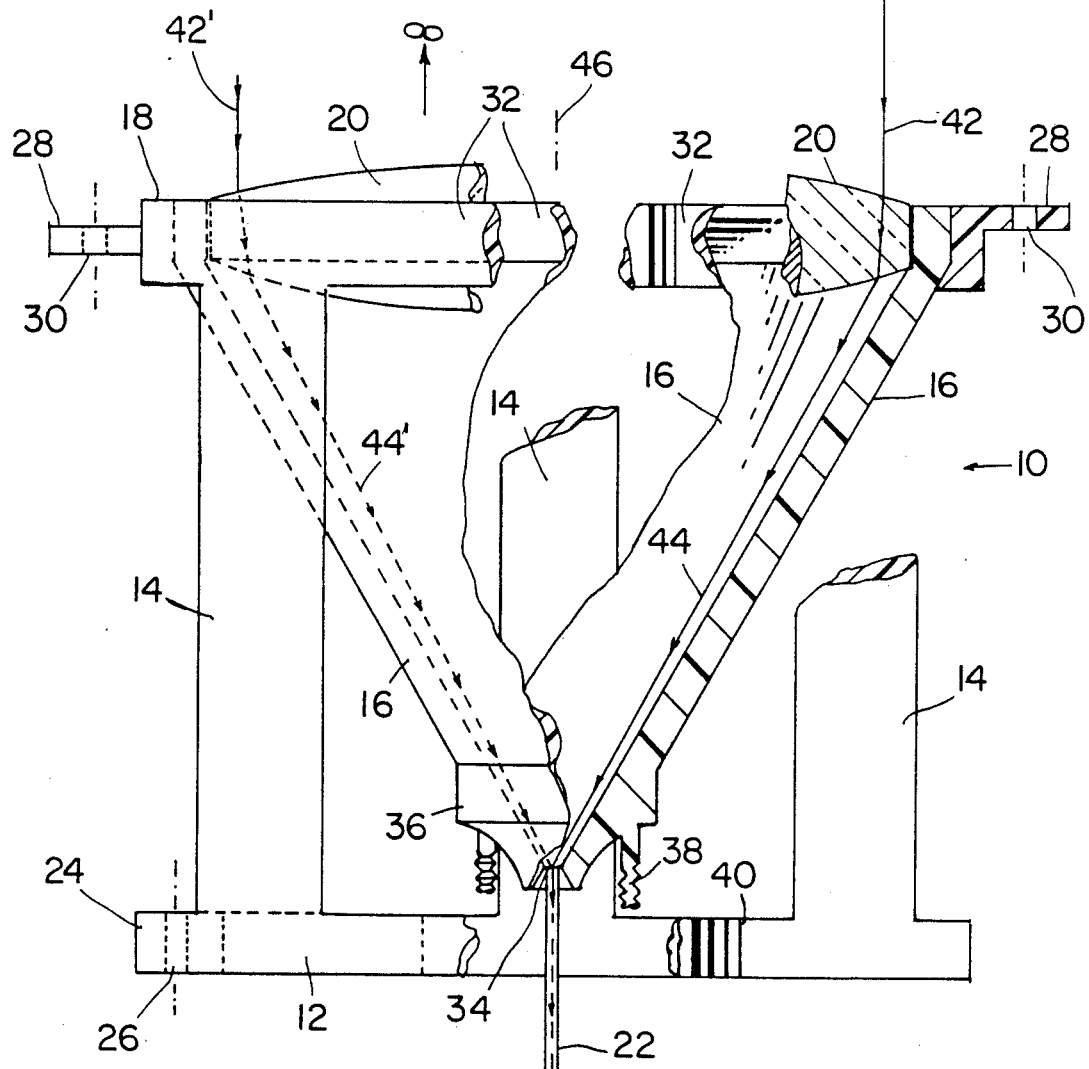
FIGS. 1A and 1B are partial cutaway, cross-sectional side views of different embodiments of the collector cell according to the present invention.
Figure 1B:
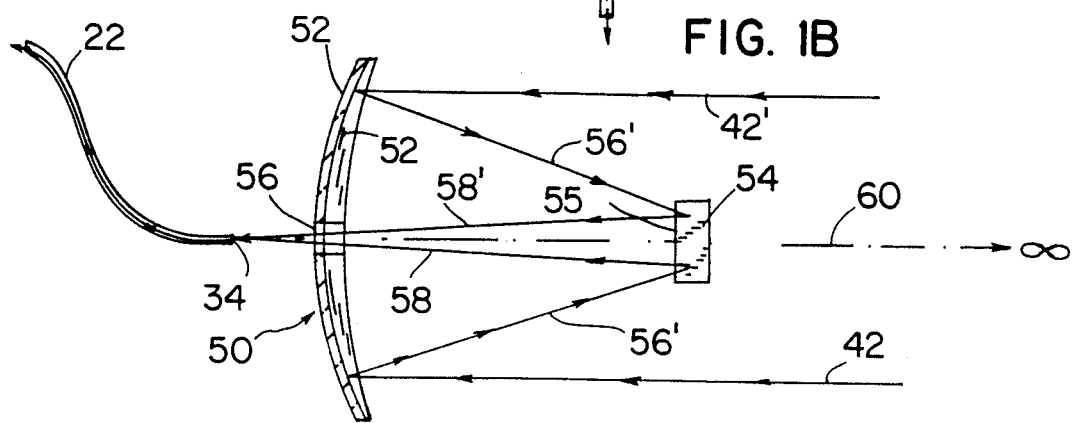

FIGS. 1A and 1B illustrate two different embodiments of electromagnetic energy collector cells according to the present invention, with FIG. 1A illustrating the use of a refracting collector cell and FIG. 1B illustrating a reflecting collector cell. Other types of cells may be utilized, for instance a cell using both reflecting and refracting principles. These types of cells are known to those skilled in the art, and the type of cell used for collecting electromagnetic radiation is not critical, as long as it is capable of collecting the electromagnetic radiation and concentrating it to a point where it is received in an optical fiber waveguide.

Referring now to FIG. 1A, a preferred embodiment of the refracting collector cell is generally indicated at 10 and has a base 12, supports 14, and a covering cone 16, a lens retaining portion 18, a lens 20 and an optical fiber bundle 22. Optical fiber bundles are standard in the field of fiber optics, as are image coherent optical fibers.

Base 12 has means for attachment, such as a protruding flange 24 having a bore 26 through which a bolt (not shown) may be inserted and attached to a collector foundation support (not shown) which maintains the collector cell 10 in a stable, secure position.

Alterative or supplemental attachment means may be provided such as flanges 28 attached to lens retaining portion 18 also having bores 30. Although flange 28 is shown as a separate element from covering cone 16, they may be integrally connected or manufactured as a unitary element. Lens retaining portion has a band 32 encircling lens 20 protecting the lens from damage.

Supports 14 have the dual purpose of supporting the lens retaining portion 18 at a distance from base 12, and also serving to maintain the exact focal distance between the lens and the end face 34 of optical fiber bundle 22. Optical fiber bundle face 34 may be ground to have a flat face, or may have a rounded configuration with each separate fiber strand arrayed facing different portions of lens 20 for maximum electromagnetic energy receipt.

Covering cone 16 may be provided with a hardened rim 36 acting as an attachment for supporting screw threaded bolts 38 shown integrally attached to rim 36. Bolts 38 may be attached to the collector foundation through a hole 40 in base 12 and may be used to fine tune and adjust the exact distance at which end face 34 is positioned relative to the focal point of lens 20. Such a fine tune adjustment becomes necessary as will be described below with regard to the optical telescope function of the present invention.

The operation of the refracting collector cell 10 will become readily apparent to a person familiar with astronomy. Incident electromagnetic radiation, effectively emanating at infinity and shown for example as rays 42, 42' striking lens 20 are refracted by the lens and directed along pahts 44, 44' as well as all other paths not specifically shown, until they impinge on end face of fiber optic bundle 22. If a rounded configuration end face, as discussed above is used, the examples of rays 44, 44' are sufficient to explain the operation of the device and it will be apparent to one of ordinary skill in the art that any other beam will follow a similar type path which can be extrapolated until it impinges on end face 34. For instance, a ray (not shown) traveling along center line 46 will be focussed and impinged at exactly the center of fiber bundle end face 34. Incident ray 42 will impinge on lens 20 at the right side, as shown in FIG. 1A, and be directed along ray path 44 to the end face at the right side, as shown in FIG. 1A, and impinge on optical fiber bundle end face 34. Likewise, incident ray 44' will be directed by lens 20 to the left side of optical fiber bundle end face 34. The incident image impinging on lens 20 will remain coherent as it passes into optical bundle 22.

FIG. 1B illustrates an alternate embodiment of the collector cell generally shown at 50, having reflecting collector mirror 52 and reflecting focussing mirror 54. A configuration is illustrated having a hole 56 in reflecting mirror 52 through which pass reflected rays 58, 58' after they are reflected from focussing mirror 54 so as to minimize distortion and maintain symmetry of the optical image. Rays 58, 58', as well as the other rays 56', which can be extrapolated, all reflect from focussing mirror 54 which can have a flat or curved reflecting face 55 (flat shown) which focusses the image onto end face 34 of fiber optic bundle 22.

Such an arrangement reflects the image perpendicular to the centerline 60, where the rays impinge on an end face of a fiber optic bundle (not show in that position).

Figure 2:
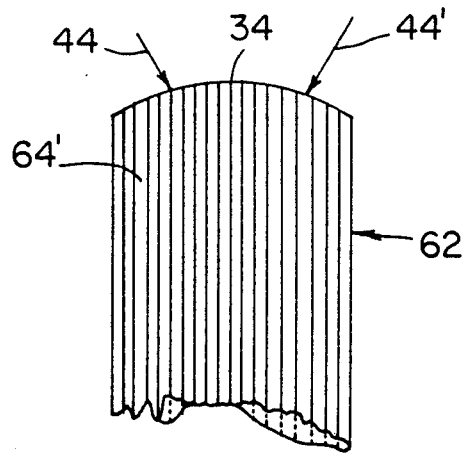
FIG. 2 shows an optical end face of a fiber bundle in cross-section.
Figure 2A:
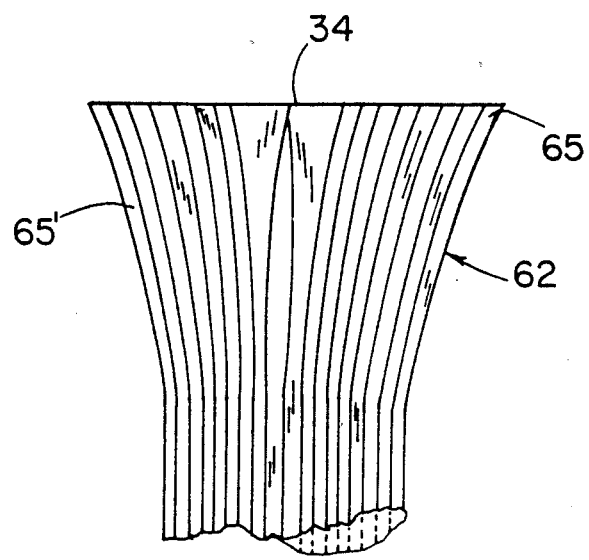
FIG. 2A shows an optical end face of a dual diameter fiber bundle in cross-section.

FIG. 2 illustrates in cross-section the optical fiber bundle 62 showing individually the fiber strands of which 64 and 64' are representative elements. The number of fiber strands are much greater in an actual bundle, but are shown in representative number for purposes of clarity. FIG. 2A illustrates a fiber optic bundle 62 also disclosed as a dual diameter fiber optic cable as in U.S. Ser. No. 889,223 filed July 25, 1986 to the inventor of the present invention, (U.S. Pat. No. 4,828,348) and hereby incorporated by reference. The cable disclosed in that patent is shown as having a planar end face, which would work together with the invention disclosed herein. Shown are individual fiber strands of which 65 and 65' are representative elements. Moreover, a dual diameter fiber 62 is capable of maintaining a coherent image with a minimum of distortion of the image propagated through the bundle.

A curved end face 34 however, is possible in that the light rays focussed on end face 34 will be focussed, either by refracting lens 20, the combination reflecting-/focussing mirrors 52, 54, or other equivalent and alternate embodiments (not shown) which will be readily apparent to a skilled practitioner.

The focussed rays, 44, 44' shown in FIG. 2 are from different directions, and a curved end face 34 will be in position to receive rays 44, 44' etc., in the respective individual fibers, such as 64, 64' which face the expected direction of the incident rays.

Figure 3:
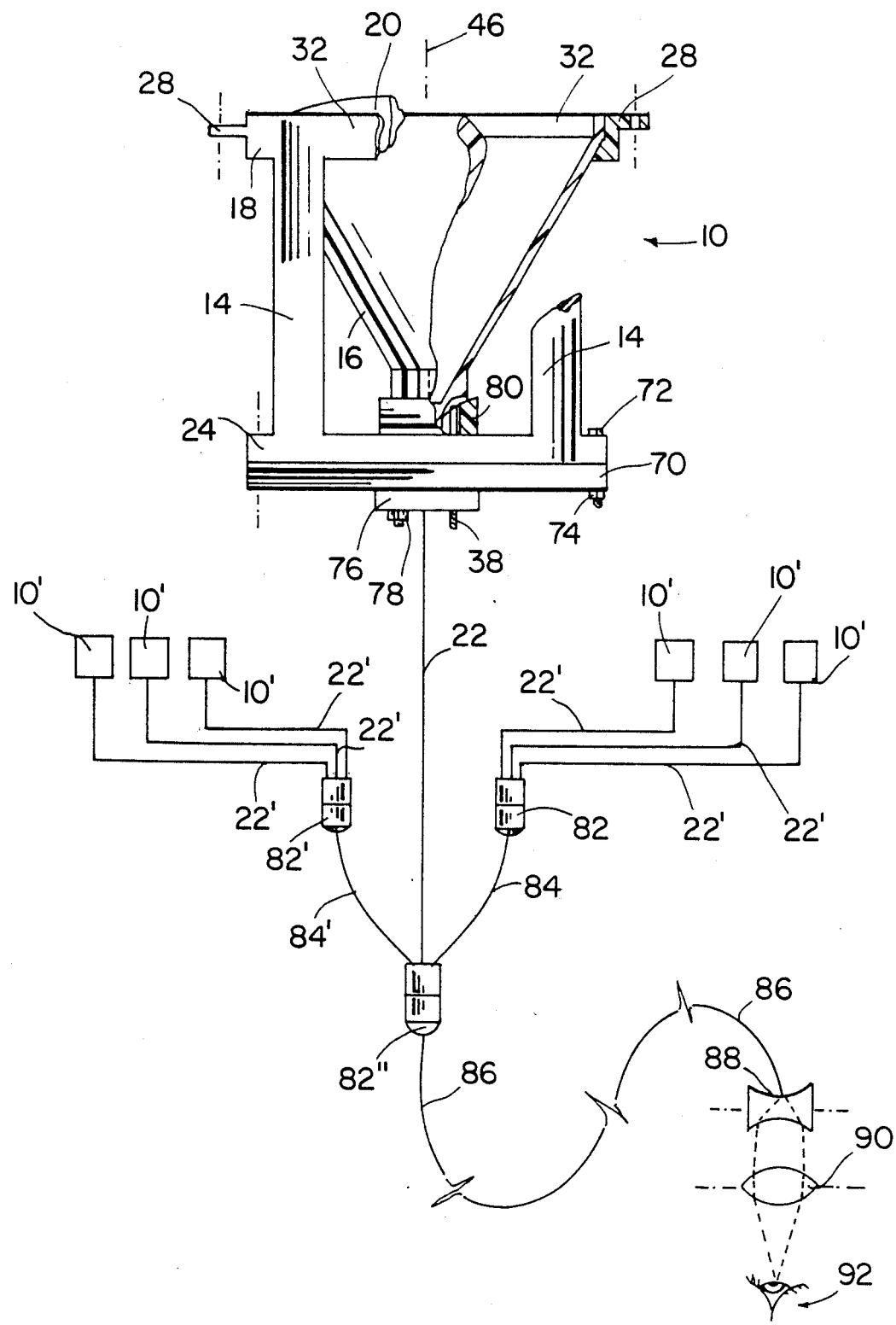
FIG. 3 is a side view in partial cross-section of one cell and a schematic diagram of the connector system according to the present invention.

Referring now to FIG. 3 the collector cell 10 illustrated in FIG. 1A is shown connected to an electromagnetic energy collection system, with identical elements being indicated by identical reference numerals.

FIG. 3 also illustrates how this embodiment is attached for stability to a foundation support 70 by means of a bolt 72 and nut 74 arrangement. Further stability and adjustability of the focal length is provided by retainer plate 76 through which screws 38 protrude. Retainer plate 76 abuts foundation support 70 and the adjusting nuts 78 attaching plate 76 to screws 38 apply pressure on the attaching plate 76 to pull housing 80 in turn attached to cone 16 and rim 18 in a longitudinal direction so as to adjust the focal length of the collector cell.

Fiber bundle 22, through which the incident electromagnetic energy propogates, is then connected to other collector cells 10', shown in schematic form, by their respective fiber bundles 22'. All of the individual collector cells 10, 10' may be of the embodiment shown in FIG. 1A or they may alternatively be of the reflecting type 50 shown in FIG. 1B, or other types, or alternatively, they may have a mix of different embodiments as long as the fields of view, of each collector cell, which is dependent on the cross-sectional area of incident electromagnetic energy, is the same. It is of course also important that the center lines 46 of each collector cell by precisely aligned to point in exactly identical directions.

The optical fiber bundles 22' attached to each collector cell 10' are merged at a converging connectors 82 and 82' the embodiments of which will be discussed in more detail below, and FIG. 3 illustrates a fiber optic connector also disclosed in U.S. Ser. No. 889,223 filed July 25, 1986 (Pat. No. 4,828,348) to the inventor of the present invention, and hereby incorporated by reference. Converging connectors 82 and 82' perform the function of merging the coherent images of each of the optical fiber bundles 22' into a single coherent image which has a multiple strength of optical power and resolution dependent on the number of separate collector cells 10' and the distance between their centerline 46. The merged electromagnetic radiation is then directed into convergent optical fibers 84 and 84', or a combination of fibers 84 and fibers 22 depending on the requirements of the system. The converging connections may be provided to any desired degree and are only limited by the expense the user is willing to undergo and the intensity of the electromagnetic energy being propagated through any one particular fiber optic waveguide.

It is known that the electromagnetic energy intensity passing through a specific point is dependent on the wave number, which is reciprocal of the wavelength, and the cross-sectional area through which the electromagnetic radiation is passing. A fiber optic bundle having multiple strands has an effective cross-sectional area which is limited by the sum total of the cross-sectional areas of all of the cores of the individual fiber strands. Accordingly, it is necessary to maintain the energy intensity of the electromagnetic energy below a threshold maximum. If the intensity were to exceed the threshold, irreversible damage to the fiber optic cores would result.

One method of the present invention which overcomes this problem is to limit the wavelength frequencies which are transmitted through the fiber optic bundles to specific bands by filters or related optical shunting means. Limiting the wavelength bands to discrete portions of the electromagnetic spectrum which are of particular interest limits the energy intensity. For example, in a telescopic use, the bands may be limited to only the visible, and/or the infrared, or ultraviolet bands. In a use as an electromagnetic energy collector for heating purposes, the bands may be limited to the most effective bands which heat a particular liquid, such as water. It is know that certain particular wavelengths tend to cause vibration and molecular motion in water more than others. The frequencies thus provided to the water may be those around a limited band close to the vibrational frequencies. The remaining frequency bands may be either filtered out or shunted by the system for use in other applications.

Referring again to FIG. 3, the fiber connection of convergent connector 82" includes an electromagnetic energy output fiber bundle which may be a trunk optical fiber bundle 86. The end application of the electromagnetic radiation collector system shown in FIG. 3 is as a telescope and includes divergent lens 88 and convergent lens 90 as optical expedients for the viewer, represented in FIG. 3 as an eye 92.

Alternatively, for application in a solar heater, for example, either the trunk fiber optic bundle 86 or each separate fiber bundle, 84 or 22, 22' can be attached to a tank for heating a particular fluid, such as water. The fiber 22 itself may lead straight into the tank (not shown) and the end face directly adjoin the fluid so as to immediately receive the electromagnetic radiation emitted by the end face. The particular frequency bands known to heat the water molecule, such as those frequency bands utilized in microwave heaters, will be emitted directly into the water and heat it for this particular application.

Also considered as a pertinent adjustment for the solar heater application is the use of materials in the optical fiber strands which are susceptible to the transmission of frequency bands of interest. For example, certain materials which are known to be better transmitters of infrared radiation may be used for solar heater application, materials suitable for visible light may be used for telescopic application, or other materials known for transmitting the wavelength bands of interest for whatever radiation collection application required may be used.

Referring now to FIGS. 4A through 4E, the converging means, i.e., collectors 82, 82' are shown in more detail. For solar heater application, coherent image maintenance is not a primary consideration and almost any known multiple connection for fiber optic bundles may be utilized, including that disclosed by a serial number 868,539.

FIG. 4A shows a dual diameter fiber optic cable or bundle 84 connected to two or more converging bundles 22 indicated by 94 in FIGS. 4A strikes end face 34' of dual diameter bundle 84. As described above, a rounded configuration of end face 34, may be provided so as to receive the radiation 94 more completely, or a straight polished face may be used to maintain image coherence. Alternatively, known optical means (not shown) may be used to reduce or eliminate optical distortion from the image.

For solar heater application, the overriding consideration is completeness of radiation energy transfer and the fiber optic bundles may be directly adjoining, as is shown in FIG. 4B. End face 34" may have polished edges for a flush optical connection to fiber end faces of fiber optic bundles 82 and/or a radiation transmissive film 98 and polished surfaces of end face 34" for more complete radiation energy transfer into dual diameter optical fiber bundle 84.

Referring now to FIG. 4C, a convergent connector is illustrated which utilizes an reflective system for converging the electromagnetic energy. A curved mirror 100 is shown with input optical fiber bundles 22. Specifically, the radiation 94 having center lines 104 from fiber bundle 22 and the center lines of the radiation envelopes 104' from fiber bundle 22' are reflected from the surface 102 of the curved mirror 100. Both center lines 104 and 104' are reflected from surface 102 as shown 108 and are identical and are transferred into fiber bundle 84.

FIG. 4D illustrates another embodument of a convergent connector with a prism 120. Prism 120 is shown with optical fiber bundle 82 including focussing lenses 102' which can adjust the focus of electromagnetic radiation 94 to a desired point. Specifically, the focal point of the radiation 94 from fiber bundles 82 are merged by prism 120 into an identical ray 110 from the planar face of prism 120.

The angle of incidence of the reflected radiation ray 110 is preferably as small as possible, on the order of 3° through 5° so as to minimize the amount of radiation that is transmitted into prism 120 and to maximize the radiation ray 110 reflected from the planar face of prism 120.

Lastly, referring to FIG. 4E, illustrated is a convergent connector utilizing an optical system for converging the electromagnetic energy. Lens 112 is shown with input optical fiber bundles 22 transmitting electromagnetic energy 94 to the surface 103 of lens 112. The radiation 94 having center lines 104 from fiber bundle 22 and the center lines of the radiation envelopes 104' from fiber bundles 22' are refracted through lens 112. As the radiation exits lens 112 both center lines 104 and 104' are identical following reflection path 108 and both radiation envelopes 94 and 94' are identical and are shown as envelope 110. Envelope 110 with center line 108 is transmitted to a focal point on end face 34 of optical fiber bundle 84.

It will be understood that none of the drawings are to scale, but are drawn for ease of description and understanding. Likewise, the embodiments disclosed are representative only and are not exhaustive of the methods and devices that may be utilized to practice the teaching of the invention.

I claim:

1. A fiber optic telescope for delivering a coherent image, i.e., coherent electromagnetic radiation to a locus of useful application, comprising:
   (a) at least two collector cells for collecting the electromagnetic radiation;
   (b) first focussing means for focussing the coherent electromagnetic radiation collected by said at least two collector cells;
   (c) first fiber waveguide means having a collector cell end and a converging end and being in optical communication at its collector cell end with said at least two collector cells for receiving the coherent image, i.e., the coherent electromagnetic radiation from said at least two collector cells and in optical communication at its converging end with a converging means; and
   (d) a converging means for receiving the coherent electromagnetic radiation from said first waveguide means and focussing and converging the coherent image, i.e., the electromagnetic radiation and directing it to a locus of useful application.

2. The fiber optic telescope according to claim 1 further comprising a second fiber waveguide means for receiving said coherent image, i.e., coherent electromagnetic energy from said converging means and delivering it to the locus of useful application.

3. The fiber optic telescope according to claim 2 wherein said second fiber waveguide means further comprising adjustable third focussing means between said converging means and said second waveguide means for focussing the coherent image, i.e., the coherent electromagnetic radiation emanating from said converging means and adapting it for receipt by said second fiber waveguide means.

4. The fiber optic telescope according to claim 3, wherein said second fiber waveguide means further comprising an adjustable fourth focussing means for adapting the coherent image, i.e., the coherent electromagnetic radiation emanating from said second fiber waveguide means so that it is receivable in a detector means as a coherent recognizable image.

5. The fiber optic telescope according to claim 2 where said first and said second fiber waveguide means each are comprised of fiber optical bundles including a multiplicity of individual optical fibers.

6. The fiber optic telescope according to claim 1 wherein said converging means further comprises a dual diameter optical fiber bundle having an outwardly tapered end, said end having an end face capable of receiving the coherent image, i.e., the coherent electromagnetic energy transmitted through said collector.

7. The fiber optic telescope according to claim 6 wherein said converging means further comprises an adjustable second focussing means for adjustably focussing the coherent image, i.e., the electromagnetic radiation before it is received by said dual diameter optical fiber bundle.

8. The fiber optic telescope according to claim 1 wherein said converging means further comprises an electromagnetic energy diverting means for diverting the coherent image, i.e., the coherent electromagnetic energy emanating from a second focussing means and for aligning the coherent image, i.e., the electromagnetic radiation emanating from more than one said second focussing means so that the combined coherent image, i.e., the coherent electromagnetic energy is transmitted along the same axis.

9. The fiber optic telescope according to claim 8 wherein said diverting means comprises a lens.

10. The fiber optic telescope according to claim 8 wherein said diverting means comprises a prism.

11. The fiber optic telescope according to claim 8 wherein said diverting means comprises a curved mirror.

12. The fiber optic telescope according to claim 1 wherein at least one of said at least two collector cells comprises first focussing means having refracting focussing means for diverting the incident coherent electromagnetic energy to a point adjacent an end face of said first fiber waveguide means.

13. The fiber optic telescope according to claim 1 wherein at least one of said at least two collector cells comprises first focussing means having a reflecting focussing means for diverting the incident and coherent electromagnetic energy to a point adjacent an end face of said first waveguide means.

14. A fiber optic telescope according to claim 1 wherein the locus of useful application is a telescope.

* * * * *